(12) United States Patent
Oehm

(10) Patent No.: US 6,422,599 B2
(45) Date of Patent: Jul. 23, 2002

(54) AIRBAG SYSTEM FOR MOTOR VEHICLES

(75) Inventor: Klaus Oehm, Gifhorn (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/815,197

(22) Filed: Mar. 22, 2001

Related U.S. Application Data

(63) Continuation of application No. PCT/EP99/06398, filed on Sep. 1, 1999.

(51) Int. Cl.$^7$ ................................................. B60R 21/26
(52) U.S. Cl. ..................... 280/736; 280/741; 280/728.1; 280/740; 280/732
(58) Field of Search ............................... 280/736, 741, 280/742, 732, 728.1

(56) References Cited

U.S. PATENT DOCUMENTS

| | | | |
|---|---|---|---|
| 3,861,710 A | * 1/1975 | Okubo | 280/150 AB |
| 4,244,717 A | * 1/1981 | Butcher | 55/364 |
| 5,085,565 A | 2/1992 | Barito | 418/55.4 |
| 5,152,550 A | * 10/1992 | Hoagland et al. | 280/737 |
| 5,257,818 A | * 11/1993 | Steffens, Jr. | 280/736 |
| 5,820,161 A | * 10/1998 | Svensson | 280/737 |
| 6,217,066 B1 | * 4/2001 | Coleman et al. | 280/737 |

FOREIGN PATENT DOCUMENTS

| | | |
|---|---|---|
| DE | 4225709 | 2/1994 |
| DE | 19705431 | 8/1998 |
| EP | 0582334 | 2/1994 |
| JP | 4353051 | 12/1992 |

* cited by examiner

*Primary Examiner*—Kenneth R. Rice
*Assistant Examiner*—Christopher Buchanan
(74) *Attorney, Agent, or Firm*—Baker Botts LLP

(57) ABSTRACT

Pressurized gas from a gas source for inflating one or more vehicle airbags is routed along a path that includes at least a portion of the air-conditioning ducts of the vehicle. In one arrangement a pressurized gas hose is routed through the ducts. In another arrangement the pressurized gas flows through a portion of the air conditioner ducts that is isolated by valves.

9 Claims, 1 Drawing Sheet

AIRBAG SYSTEM FOR MOTOR VEHICLES

This application is a continuation of PCT/EP99/06398 filed Sep. 1, 1999.

BACKGROUND OF THE INVENTION

This invention relates to an airbag system for motor vehicles. To increase safety in motor vehicles, airbags are arranged in, for example, the region of the dashboard and below the side windows. While each airbag may be provided with a separate gas source in the form of a gas generator, or a pyrotechnic device that causes the airbag to unfold when an accident occurs, it is also possible to provide a central gas source, which is connected with a plurality of airbags via pressurized gas ducts. Thus, for example, when an accident occurs the driver's airbag and the airbag of the passenger sitting beside the driver may be inflated by a common gas generator connected to both airbags via pressurized gas ducts. The gas ducts required for this purpose may be run as pressure hoses concealed below the paneling of the motor vehicle from the gas source to the airbags, resulting in a substantial expenditure for assembly and requiring a corresponding space for assembly of the pressure hoses.

DE 4,225,709 A1 discloses that a gas generator for an airbag system may be arranged in a section of a ventilating duct of an air-conditioning device, whereby favorable tempering of the gas generator is obtained. However, no improvement in the utilization of space nor simplification of assembly with respect to the gas path between a gas generator and airbags arranged at some distance away is obtained.

It is an object of the invention to provide an improved airbag system for motor vehicles.

SUMMARY OF THE INVENTION

In accordance with the invention, the supply of pressurized gas to the airbags of a motor vehicle, which are connected to a gas source at some distance from the airbags, is effected at least partially via air-conditioning ducts of the motor vehicle. For this purpose, the pressurized gas path may be via pressure hoses in the air-conditioning ducts. Alternately, the air-conditioning ducts themselves may be designed as a portion of the pressurized path with appropriate structural integrity. The use of the air-conditioning ducts to accommodate a portion of the pressurized gas path results in optimal utilization of space as well as simplification of assembly.

If the air-conditioning ducts themselves form a part of the pressurized gas path leading to the airbags, according to a preferred embodiment of the invention it is provided that the sections used as pressurized gas ducts be capable of being isolated from other portions of the air-conditioning ducts connected to them by at least one valve. In the event of an accident and deployment of the airbags, the valves may be controlled so that the gas duct from the gas source to the respective one or more airbags forms a direct gas duct completely isolated from the air-conditioning system. In this way, a part of the air-conditioning ducts can be used to conduct pressurized gas from the gas source to the airbags, while in otherwise normal driving operation this part of the air-conditioning ducts is available for the use of the air-conditioning system.

Control of the valves may be effected by a control which detects the occurrence of an accident, and which also activates the gas source. Thus, control of the valves requires only a suitable signal connection to the signal output of the control already present.

Alternately, the valves may be designed as pressure or flow operated valves in order to accomplish the desired isolation of the air-conditioning ducts that are not used as pressurized gas ducts when an accident occurs. Reset of the valves to air-conditioning operation may be effected with a time delay, so that in the event of an accident lasting for a longer period of time the connected airbags can remain filled with gas for a longer period. A longer-lasting accident exists, for example, in the case of repeated rollover of the motor vehicle.

In another arrangement, the valves may be controlled so that, depending upon seat occupancy, not all airbags are deployed when an accident occurs. This avoids unnecessary deployment of airbags in front of empty seats.

Conventional pressure hoses may be enclosed in the air-conditioning ducts as pressurized gas ducts, or the air-conditioning duct may be designed as a one-piece dual channel part of synthetic material with an integral gas duct. Which of these two variants is to be used in the region of the air-conditioning ducts may be made dependent upon the respective structural circumstances.

The invention is described in detail below by an example, and its scope is pointed out in the claims.

DESCRIPTION OF THE PREFERRED EMBODIMENTS

Figure 1:
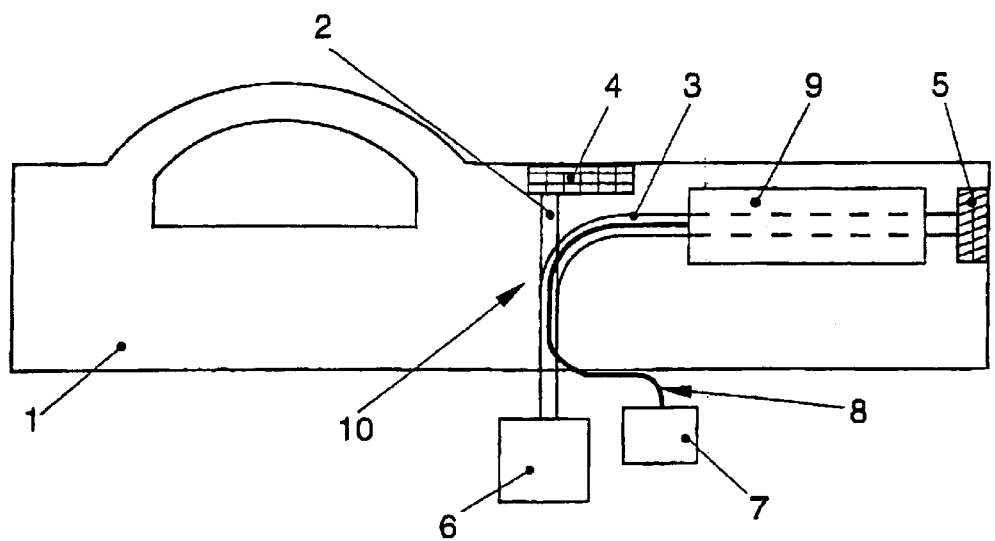
FIG. 1 is a simplified view of a dashboard with air-conditioning ducts and an airbag system.

In the simplified dashboard 1 represented in FIG. 1, air-conditioning ducts 2, 3 run from an air-conditioning device 6 to air-discharge openings 4, 5. A gas source 7 is connected via a pressurized gas duct 8 with an airbag 9 arranged in the dashboard 1. The pressurized gas duct 8 runs partly in the air-conditioning duct 3, the gas duct 8 being a pressure hose that is enclosed in the air-conditioning duct 3 in a section 10.

The gas duct 8 enclosed in the air-conditioning duct 3 may be designed integrated in the air-conditioning duct 3. The air-conditioning duct 3 may, for example, form a double-channel duct as a one-piece part of synthetic material, one channel being used as air-conditioning duct and the other channel as a pressurized gas duct.

It should be understood that the term "air conditioner ducts" is not limited to systems for cooling the vehicle by refrigeration, but includes heating and ventilating systems as well. In the arrangement of FIG. 1 the pressurized gas follows a path and through pressure hose 8 which is routed through a portion of air conditioner duct 10 through air conditioner duct 3.

Figure 2:
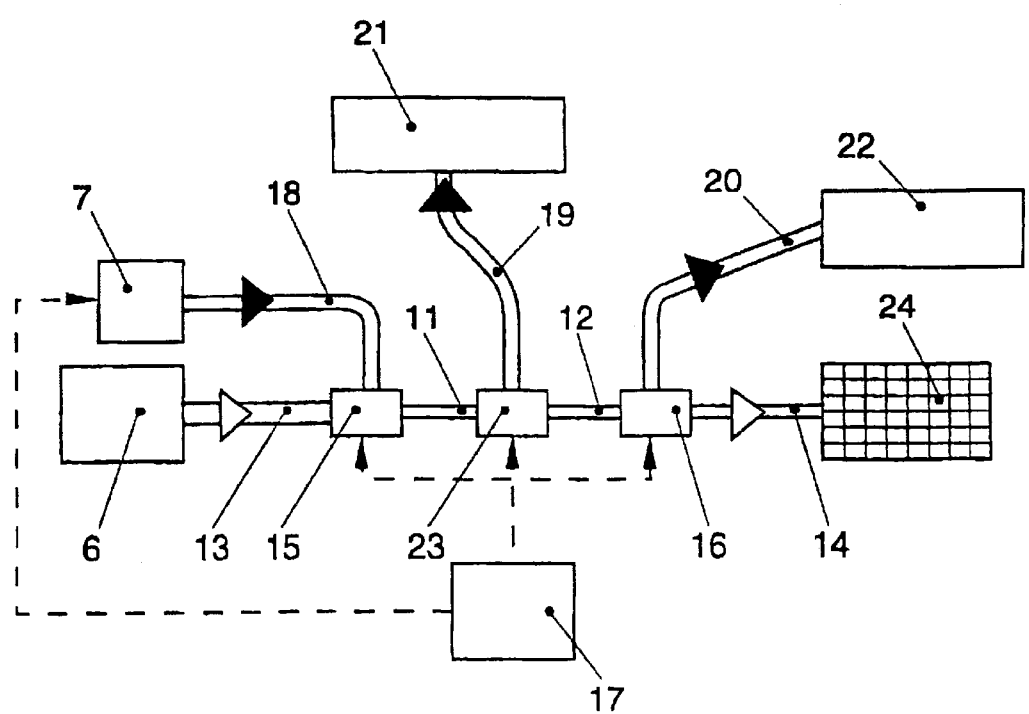
FIG. 2 is a schematic representation of an air-conditioning system and an airbag system containing two airbags.

In the airbag system shown in FIG. 2, air-conditioning duct portions 11, 12 are also used as pressurized gas ducts for the airbag system. The other air-conditioning duct portions 13, 14 and the associated vent 24 and air-conditioning unit 6 may be isolated by means of valves 15, 16 from the air-conditioning duct portions 11, 12 used as gas ducts. For this purpose, the valves 15, 16 are connected with a control 17 which activates gas source 7 in the event of an accident. When an accident occurs, gas source 7 fills airbags 21, 22 with gas, via pressurized gas ducts 18, 19, 20 and via the air-conditioning ducts 11, 12 used as gas ducts. When an accident occurs, depending upon the respective seat occupancy, valve 16 may be operated so that only one of the two airbags, such as airbag 21, is filled with gas through the valve 23.

The valves 15, 16, 23 may be designed as shutoff valves, or as switching valves. When an accident occurs, and only the airbag 21 is to be deployed, valve 23 can be switched by the control means 17 so that the air-conditioning duct 11 is connected directly with the gas duct 19, while the air-conditioning duct 12 is isolated. A direct connection may also be effected between the gas duct 18 and the air-conditioning duct 11 using valve 15, while the air-conditioning duct 13 connected with the air-conditioning device 6 is decoupled.

In normal driving operation, a direct connection between the air-conditioning device 6 and the air-discharge opening 24 may be effected by opening the valves 15, 23, 16. The valves 15, 23, 16 can decouple the gas ducts 18, 19, 20 from the air-conditioning ducts 13, 11, 12, 14.

Should both airbags 21, 22 be deployed when an accident occurs, the control 17 controls the valves 15, 23, 16 in such a way that the air-conditioning ducts 13, 14 are decoupled from the gas ducts, while the gas supply to the airbags 21, 22 is effected via the gas ducts 18, 19, 20 and the air-conditioning ducts 11, 12 serving as gas ducts.

In an alternate arrangement valves 15, 23 and 16 may be pressure operated, responsive to the pressurized gas from the gas source 7.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

I claim:

1. An airbag system for a motor vehicle having an air-conditioning duct connecting an air conditioning device with one or more air discharge openings, wherein at least one airbag is connected with a central gas source via a pressurized gas path for filling the airbag, wherein at least a portion of the pressurized gas path extends via a portion of said air-conditioning duct between said air conditioning device and at least one discharge opening.

2. An airbag system as specified in claim 1 wherein said pressurized gas path includes a pressurized gas duct and wherein said pressurized gas duct extends through said portion of said air-conditioning duct.

3. An airbag system as specified in claim 2 wherein said pressurized gas duct comprises a hose.

4. An airbag system as specified in claim 1 wherein said air-conditioning duct is a dual channel duct having a channel for pressurized gas for said airbag and a channel for air conditioning air.

5. An airbag system as specified in claim 1 wherein said pressurized gas path comprises said portion of said air-conditioning duct.

6. An airbag system as specified in claim 5 further including at least one valve for isolating said portion of said air-conditioning duct from other portions of said air-conditioning duct.

7. An airbag system as specified in claim 6 wherein a control is provided for activating said gas source and said at least one valve.

8. An airbag system as specified in claim 7 wherein there is provided a plurality of said valves, and wherein said control individually operates said valves according to passenger occupancy in said motor vehicle.

9. An airbag system as specified in claim 6 wherein said valve is activated by gas pressure of pressurized gas for said airbag.

* * * * *